Dec. 24, 1935. C. N. MITCHELL 2,025,299
PACKING RING
Filed Jan. 10, 1930
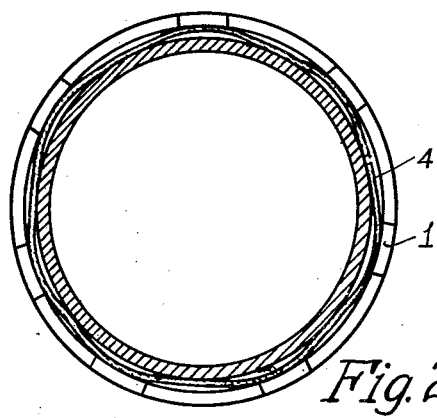
Fig.2.
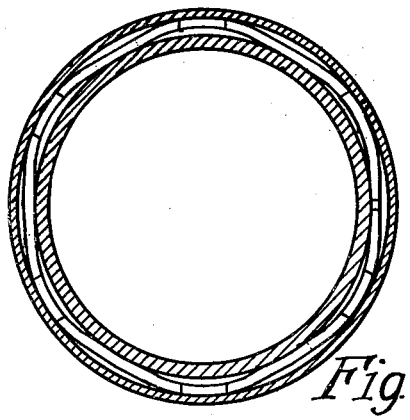
Fig.3.
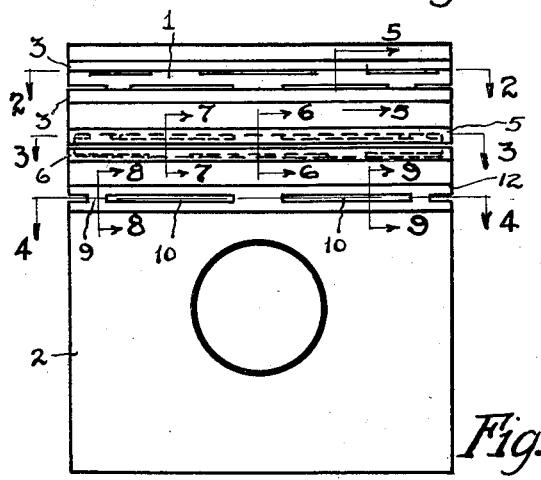
Fig.1
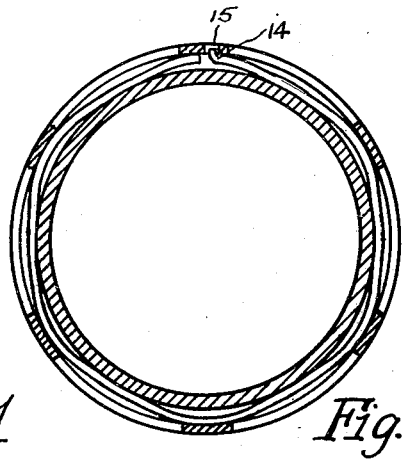
Fig.4.
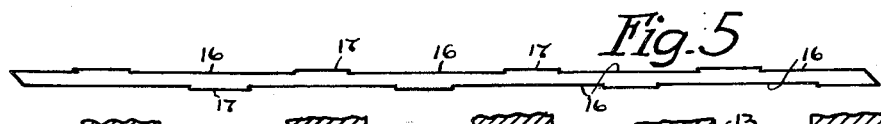
Fig.5
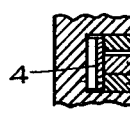 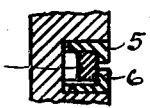  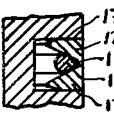 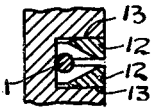
Fig.6.   Fig.7.   Fig.8.   Fig.9.   Fig.10
Fig.11.
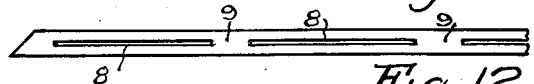
Fig.12.
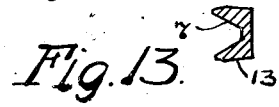
Fig.13.
INVENTOR.
Courtney N. Mitchell
BY Fay, Oberlin & Fay
ATTORNEYS.

Patented Dec. 24, 1935

2,025,299

UNITED STATES PATENT OFFICE 2,025,299

PACKING RING

Courtney N. Mitchell, Cleveland Heights, Ohio

Application January 10, 1930, Serial No. 419,838

4 Claims. (Cl. 309—24)

This relation relates to packing rings primarily for pistons and is an improvement on the structure disclosed in my prior application Serial No. 240,427 filed December 16, 1927, and has for its chief object to provide a ring which will support the piston in a central position in the cylinder by taking a material portion of the wall pressure between the cylinder and piston, thus preventing loose or worn pistons from slapping or striking heavily against the cylinder wall when the forces on the piston pin are reversed as occur at upper and lower dead center positions of the piston. A further object of this invention is to provide a ring which will prevent motion in the axial direction in the grooves of the piston. Another object is to provide a ring in which it is possible to vary the nominal clearances in the piston ring groove over a wide range. A further object is to provide a ring that is flexible in the axial direction making it adaptable to fit grooves of variable widths. A further object is to provide a ring which is of light weight, simple in construction, less expensive, and otherwise more convenient. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a side elevation of a piston showing several assembly arrangements of various forms of my improved ring; Fig. 2 is a transverse section on the line 2—2 of Fig. 1; Fig. 3 is a transverse section on line 3—3 of Fig. 1; Fig. 4 is a transverse section on line 4—4 of Fig. 1; Fig. 5 is a developed view of one form of the ring; Fig. 6 is an enlarged section on line 5—5 of Fig. 1; Fig. 7 is an enlarged section on line 6—6 of Fig. 1; Fig. 8 is an enlarged section on line 7—7 of Fig. 1; Fig. 9 is an enlarged section on line 8—8 of Fig. 1; Fig. 10 is an enlarged section on line 9—9 of Fig. 1; Fig. 11 is a developed view, with details thereof exaggerated, of a portion of a ring illustrated in section 4—4 of Fig. 1, said ring being in condition ready for assembly into the piston; Fig. 12 is a developed view of a portion of the ring illustrated in Fig. 11 before such ring is shaped or heat treated; and Fig. 13 is an enlarged section of the ring on line 8—8 of Fig. 1 before said ring is assembled into the piston.

In Fig. 1, ring 1 which is shown in development in Fig. 5 illustrates one form of the ring. This ring may be made from an ordinary plain piston ring by machining in the plain ring shallow notches or castellations 16, the notches or castellations on one face of the ring being opposite the lands or spaces 17 between the notches or castellations on the opposite face of the ring.

In order to secure the maximum amount of sealing effect in the least space, and also to utilize the axial expanding feature of ring 1 to a fuller extent, said ring 1, which is shown in development in Fig. 5, is mounted between two plain rings 3 in one piston ring groove, as shown in Fig. 1, and more especially in Fig. 6. In order to maintain uniform contact between the outer cylindrical surfaces of these rings and the surrounding cylinder wall, a spring expander member 4, best shown in Fig. 2, is placed in the ring groove back of the rings. The expanding effect of spring member 4 centralizes the piston in the cylinder and prevents its tending to rock on the piston pin and slap against the cylinder walls.

In order to maintain uniform contact between the outer cylindrical surfaces of the ring and the surrounding cylinder wall and also to provide for axial flexibility so as to keep the sides of the ring in engagement with the sides of the ring grooves in the piston, rings 5 and 6 and spring expander 4 may be used as shown at section 3—3 in Fig. 1, and more especially Figs. 7 and 8. In this arrangement the spring expanding member 4 serves the double purpose of keeping the rings 5 and 6 in proper bearing relation at their outer cylindrical surfaces with the surrounding cylinder wall, and also tends to displace the rings 5 and 6 in an axial direction against the sides of the ring grooves.

In Fig. 1, at section 4—4 and more especially in Fig. 11, there is another form of packing ring 12 which may be used to accomplish the purposes herein set forth. This ring 12 may be made from an ordinary plain piston ring of approximately the same width as the groove in which it is to be used. The groove 7 is machined in the inner periphery of the ring 12, as shown in Fig. 13.

Said ring is then slotted at its center so as to provide alternate slots 8 and lands 9 as shown in Fig. 12. The lands 9 formed between the slots 8 being very thin, will bend easily, permitting the included angle between the sides of the V groove 7 to be enlarged, thus increasing the width of the ring 12. After the ring 12 has been machined, as shown in Fig. 12, the included angle between the sides of the V groove increased by suitable expanding means and the slots 8 may be enlarged to form slots 10 in Fig. 11, and held by such expanding means during a suitable process of heat treatment which will cause the ring 12 to retain its deformed shape after the expanding means has been removed. The ring 12 thus formed will have an axial elasticity which will keep the sides 13 of the ring 12 in constant engagement with the sides of the ring groove in the piston.

To further insure axial elasticity of ring 12 and maintain its sides 13 in constant engagement with the sides of the ring groove in the piston, an expander member 11, having preferably a circular cross section, may be used as shown in Figs. 9 and 10. The effect of this expander member 11 is to force the ring 12 outwardly and keep its outer cylindrical surface in uniform contact with the cylinder wall. In forcing said ring 12 outwardly, said expander member 11 will bear against the sides of the V groove formed on the inner surface of said ring 12 and materially assist in axially expanding said ring 12 and keep its side 13 pressed against the sides of the ring groove in the piston. One end 14 of said spring expander member 11, as shown in Fig. 4, is formed to engage in recess 15 of ring 12 to prevent rotation of one element with respect to the other.

It is to be noted that rings of the type shown and described herein have all of the advantages named and readily accomplish the purposes specifically set forth, and in a general way are adaptable to be used where such rings are commonly employed.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a piston ring, two non-parallel lateral faces, an outer periphery adapted to contact a cylinder wall, an inner periphery having a circumferentially extending V shaped groove, said V shaped groove being formed initially whereby said lateral faces are spaced at a greater distance adjacent the inner periphery than adjacent the outer periphery, and the said faces being spaced so as to be moved into substantially parallel positions when the said ring is inserted in a piston ring groove.

2. In a piston ring, two non-parallel lateral faces, an outer periphery adapted to contact a cylinder wall, an inner periphery having a circumferentially extending V shaped groove, said V shaped groove being so formed initially that said lateral faces are spaced at a greater distance adjacent the inner periphery than adjacent the outer periphery, said faces being so spaced as to be moved into substantially parallel positions when the said ring is inserted in a piston groove, and the inner circumferentially extending edge of one lateral face being chamfered.

3. In a piston ring, two lateral faces, an outer periphery adapted to contact a cylinder wall, an inner periphery having a circumferentially extending V shaped groove, circumferentially extending passages joining the inner periphery with the outer periphery, the said V shaped groove being formed so that the lateral faces are spaced at a greater distance adjacent the inner periphery than adjacent the outer periphery, and the said faces being spaced so as to be moved into substantially parallel positions when the said ring is inserted in a piston ring groove.

4. In a piston ring, two non-parallel lateral faces, an outer periphery adapted to contact a cylinder wall, an inner periphery having a circumferentially extending groove, said groove being formed initially whereby said lateral faces are spaced at a greater distance adjacent the inner periphery than adjacent the outer periphery, and the said faces being spaced so as to be moved into substantially parallel positions when the said ring is inserted in a piston ring groove.

COURTNEY N. MITCHELL.